(12) United States Patent
Vasyutynskyy

(10) Patent No.: US 10,554,750 B2
(45) Date of Patent: Feb. 4, 2020

(54) DATA SHARING IN A CLOUD

(71) Applicant: SAP SE, Walldorf (DE)

(72) Inventor: Volodymyr Vasyutynskyy, Dresden (DE)

(73) Assignee: SAP SE, Walldorf (DE)

( * ) Notice: Subject to any disclaimer, the term of this patent is extended or adjusted under 35 U.S.C. 154(b) by 279 days.

(21) Appl. No.: 14/816,215

(22) Filed: Aug. 3, 2015

(65) Prior Publication Data

US 2017/0041391 A1    Feb. 9, 2017

(51) Int. Cl.
    *H04L 29/08*    (2006.01)

(52) U.S. Cl.
    CPC ............................ *H04L 67/1097* (2013.01)

(58) Field of Classification Search
    USPC ........ 709/212–217; 707/100, 101, 620, 625; 726/4
    See application file for complete search history.

(56) References Cited

U.S. PATENT DOCUMENTS

| | | |
|---|---|---|
| 8,407,205 B2 | 3/2013 | Doshi et al. |
| 8,463,752 B2 | 6/2013 | Brinkmoeller et al. |
| 8,533,774 B2 | 9/2013 | Zielinski et al. |
| 8,553,965 B2 | 10/2013 | Zhao et al. |
| 8,595,798 B2 | 11/2013 | Anand et al. |
| 8,612,406 B1 | 12/2013 | Said et al. |
| 8,613,004 B2 | 12/2013 | Hacigumus et al. |
| 8,756,247 B2 | 6/2014 | Kuo et al. |
| 8,811,620 B2 | 8/2014 | Chaves et al. |
| 2008/0312946 A1* | 12/2008 | Valentine ............. G06Q 20/382 705/64 |
| 2011/0077977 A1* | 3/2011 | Collins .................. G06Q 40/02 705/4 |
| 2011/0276537 A1 | 11/2011 | Jegerlehner et al. |
| 2012/0144407 A1* | 6/2012 | Hacigumus ........... G06F 9/5072 719/328 |
| 2013/0080535 A1 | 3/2013 | Rolia et al. |
| 2013/0211555 A1 | 8/2013 | Lawson et al. |
| 2013/0275509 A1 | 10/2013 | Micucci et al. |
| 2013/0304510 A1* | 11/2013 | Chen ...................... G06Q 10/06 705/3 |
| 2013/0332987 A1* | 12/2013 | Tenneti ................... G06F 21/10 726/1 |
| 2014/0067801 A1* | 3/2014 | Marvit ............. G06F 17/30241 707/736 |
| 2014/0173702 A1 | 6/2014 | Wong et al. |

(Continued)

OTHER PUBLICATIONS

Sreedhar Pelluru, "Introduction to Azure Data Factory Service", updated on Jul. 31, 2015, last printed on Aug. 3, 2015, and available from https://azure.microsoft.com/en-in/documentation/articles/data-factory-introduction/.

*Primary Examiner* — Younes Naji
*Assistant Examiner* — Da T Ton
(74) *Attorney, Agent, or Firm* — Mintz Levin Cohn Ferris Glovsky and Popeo, P.C.

(57) ABSTRACT

A system, a method, and a computer program product for sharing data in a cloud are provided. A request for accessing data associated with a first entity is generated. A sharing policy associated with the first entity is accessed. Access to a portion of the data is provided based on at least one parameter contained within the sharing policy. The access to the portion of the data is provided using at least one integrated view.

22 Claims, 6 Drawing Sheets

(56) References Cited

U.S. PATENT DOCUMENTS

| | | |
|---|---|---|
| 2014/0229438 A1 | 8/2014 | Carriero et al. |
| 2014/0258865 A1* | 9/2014 | Papish .............. G06F 17/30861 715/719 |
| 2016/0098769 A1* | 4/2016 | Naik ...................... G06Q 30/04 705/34 |

* cited by examiner

DATA SHARING IN A CLOUD

TECHNICAL FIELD

This disclosure relates generally to data processing and, in particular, to sharing data, for example, business data, in a cloud.

BACKGROUND

Modern day companies rely on software applications and significant amount of data to conduct their business. Software deals with various aspects of companies' businesses, e.g., finances, product development, human resources, customer service, management, etc. To effectively conduct their businesses, companies may wish to obtain data that is not within their control. This data can include data that can be publicly available from governmental agencies (e.g., federal government, state governments, municipalities, etc.) as well as data available from various private entities, e.g., companies, organizations, individuals, etc. In some cases, companies may wish and/or may be required to share their data with other entities (whether private or public entities) for a variety of purposes.

Sharing of data may be useful for the purposes of effectively setting up and/or conducting business in a particular geographical area. For example, a retailer wishing to setup a brick and mortar store in a particular area can seek to obtain census data relating to the population residing in that area from government agencies as well as private company data belonging to companies already doing business in that area to determine spending habits of the residents. Data can also be shared for a variety of other purposes, e.g., manufacturing, research and development, marketing, advertising, etc.

Data can include any form of data, e.g., emails, files, videos, text, data tables, reports, forms, etc. Conventional ways of sharing data typically require elaborate processes that may include significant preparations and triggers to be implemented. Such processes introduce substantial time delays and processing costs. Thus, there is a need for a process of sharing data that is simplified and relatively inexpensive allowing entities to get access to vital data quickly, as well as a process that can support finely-granular regulation of confidence of data based on a sharing policy and that can allow easier sharing of data through use of database mechanisms and platform-based support, thereby providing a convenient and user-friendly data exchange

SUMMARY

In some implementations, the current subject matter relates to a computer-implemented method for sharing data in a cloud. The method can include generating a request for accessing data associated with a first entity, accessing a sharing policy associated with the first entity; and providing access to a portion of the data based on at least one parameter contained within the sharing policy, wherein the access to the portion of the data is provided using at least one integrated view. At least one of the generating, the accessing, and the providing can be performed by at least one processor of at least one computing system.

In some implementations, the current subject matter can include one or more of the following optional features. The method can also include transforming the portion of data into a predetermined data format. The predetermined data format can be defined in the generated request for accessing data. This can be accomplished using a data transformation service.

In some implementations, the method can also include combining, based on the generated request, a plurality of portions of data associated with a plurality of entities in accordance with a sharing policy associated with each entity in the plurality of entities, and providing access to the combined plurality of portions of data. A shared data access component can determine a plurality of sharing policies from the sharing policy repository and based on those policies, present a combined shared data to the requestor.

In some implementations, data access can be provided in at least one of the following: a materialized view containing a replication of the portion of data and a non-materialized view containing a direct compilation of data in the integrated view. In some implementations, data associated with the first entity can be stored in a cloud storage. The portion of data can include at least one of the following: a current data associated with the first entity, a historical data associated with the first entity, a prospective data associated with the first entity, a planning data associated with the first entity, etc.

In some implementations, the method can also include denying, based on the sharing policy, access to the portion of data.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
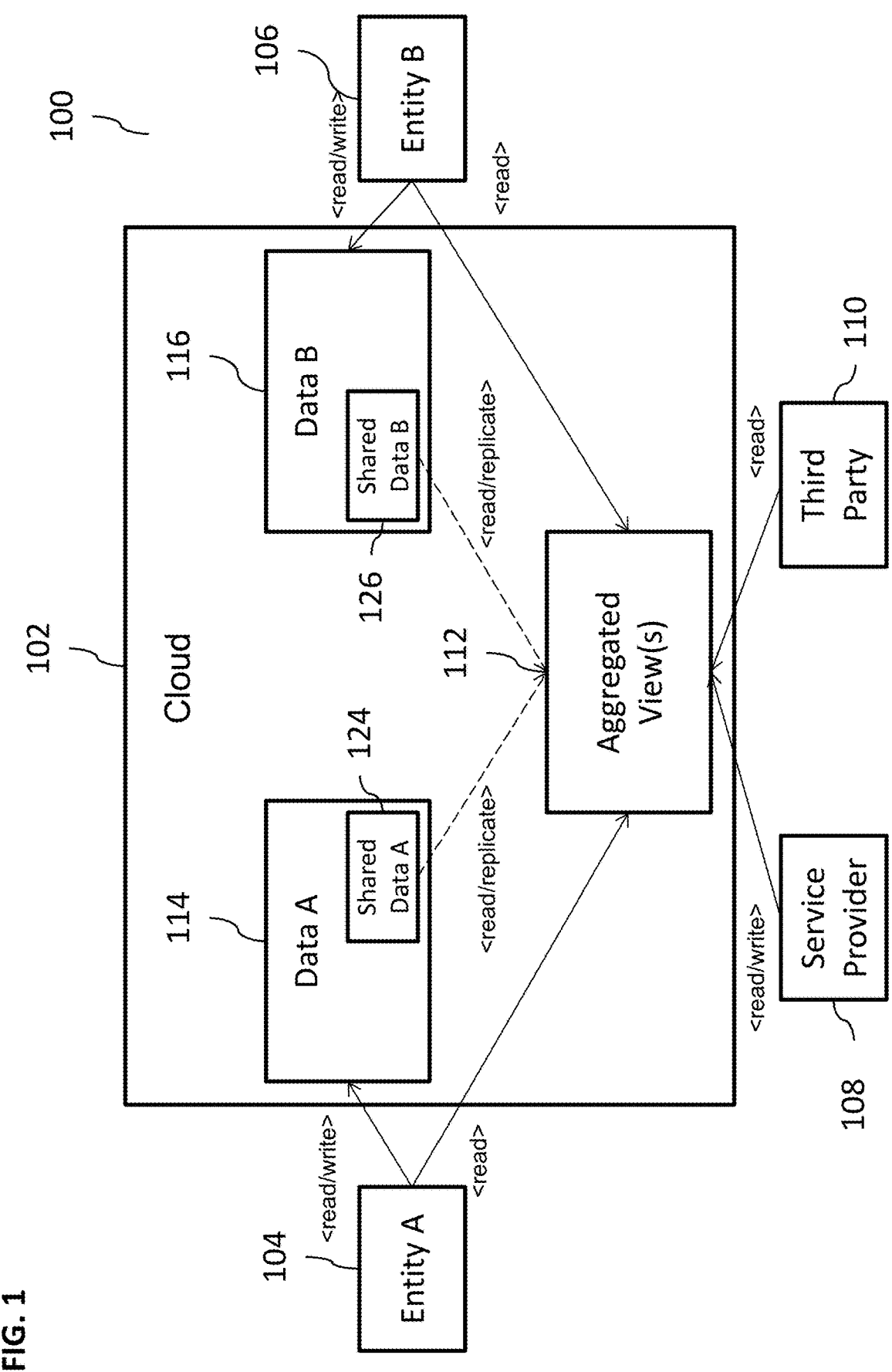
FIG. 1 illustrates an exemplary system for sharing of data, according to some implementations of the current subject matter.

In some implementations, the current subject matter relates to systems, method, and computer program products for sharing business data among entities (e.g., companies, organizations, applications, software, business processes, etc.) having different business roles using various cloud capabilities and/or technologies. The current subject matter can perform sharing portions of entities' data based on various sharing policies (which can describe which/how data should be shared), transforming data from the customer-specific data structure into data structure described in data catalogs using specific transformation services, accessing shared data using integrated views by entities as well as by other parties that may be involved in sharing, as described by the sharing policies, authorities, companies, service providers, etc. The integrated views can be materialized (including replication of data in the view) and/or non-materialized (including direct compilation of data in the view during the view querying). In some implementations, the shared data can be combined with other data (e.g., geospatial data, statistics, etc.). The entities can also share current information, historical information, planning data, as well as any other types of data.

In some implementations, the current subject matter can provide sharing of data among entities in a variety of scenarios. The current subject matter's sharing of data can allow making right business decisions that require companies and/or organizations to share non-critical information between each other for different purposes (e.g., optimizing usage of resources, market capacities, service sharing, etc.). The following is a discussion of some such exemplary scenarios (others can be implemented as well as the current subject matter is not limited to the ones discussed below). One such exemplary, non-limiting scenario involves sharing of data in the Internet of the Things ("IoT"). The IoT is a network of physical objects or "things" that can be embedded with electronics, software, sensors, and/or connectivity. The IoT can enable exchange of data between manufacturers, operators and/or other connected devices. The exchange of data is governed by the infrastructure of International Telecommunication Union's Global Standards Initiative. The IoT can be connected physically and/or remotely by individuals, e.g., as a computer network grid. Each thing in the IoT can be uniquely identifiable through its embedded computing system but is able to interoperate within the existing Internet infrastructure. In the IoT, the data can be collected by one company from sensors, machines, products, etc. by various entities (e.g., manufacturer, customer, user, a third party, etc.). Another company can provide analytic services, e.g., predictive maintenance for the machines that require real-time access to sensor data of the first company. In this case, the real-time data sharing can be provided between two involved companies.

In another exemplary, non-limiting scenario, several chain store companies can desire to optimize location and/or capacities of their stores in a particular region. Both companies can benefit when they share information about actual and/or planned location and/or other anonymized business data relating to their stores (e.g., number of customers, prices of groups of products, etc.) in real-time. At the same time, their own confidential information can be strictly protected.

In yet another exemplary, non-limiting scenario, along with commercial companies, there can be federal, state, municipal, etc. entities, organizations, institutions, etc., which may be interested in obtaining and/or sharing of real-time data, analysis, statistics, etc. Combining this exemplary scenario with the second one discussed above, the local authorities may be interested, for example, in the uniform placing of the chain stores in their responsible areas. Thus, the local authorities can use the information from the above second scenario to observe and/or plan area development. The local authorities can also be interested in other types of statistics concerning commercial entities in their areas, e.g., geospatial distribution of companies in their areas, development of economical branches, taxation, etc. The commercial entities can also be interested in the data belonging to the local authorities for a variety of purposes. The current subject matter can allow such dual sharing of data and/or information.

In some implementations, the data that can be shared can be critical, non-critical, confidential, non-confidential, identified data, de-identified data, and/or any other type of data. The data can be shared without any restrictions, conditions, etc., or using a variety of conditions, restrictions, confidentiality provisions, etc. These can be associated with the data that can be designated for sharing. The shared data can be target entity-specific and/or can be sharable with multiple entities. The sharing of data between entities can use cloud-type technologies, including, but not limited to High-Performance Analytic Appliance ("HANA") in memory database and/or HANA Cloud Platform, as developed by SAP SE, Walldorf, Germany.

FIG. 1 illustrates an exemplary system 100 for sharing of data, according to some implementations of the current subject matter. The system 100 can include a cloud storage system 102, entity A 104, entity B 107, service provider 108, and a third party 110. The cloud storage system 102 can be any type of network, which can include one or more servers and/or one or more storage locations that can be communicatively coupled with one or more servers. The storage system 102 can also be any type of storage system, database, and/or any other memory location that can storage data from a plurality of sources in a variety of ways. It can also include functionalities of enterprise resource planning ("ERP"), customer relationship management ("CRM"), and/or any other business processes.

Entities A and B 104, 106 can be any commercial entities, companies, government entities, organizations, and/or any other types of entities. In some implementations, entities A and B can be business processes, applications, software, business process applications, and/or any other types of applications. There can be more than two entities 104, 106. The entities 104, 106 can be communicatively coupled to the cloud storage system 102 using any wired and/or wireless communications (e.g., using local area network ("LAN"), wide area network ("WAN"), metropolitan area network ("MAN"), Internet, intranet, virtual networks, and/or any other type of network).

Third party 110 (and/or multiple third parties 110) can be communicatively coupled with the cloud storage system 102. The third party 110 can be any commercial entity, company, government entity, organization, and/or any other type of entity. In some implementations, the third party 110 can be a business process, an application, software, a business process application, and/or any other type of application.

The service provider 108 can be any service provider that can be communicatively coupled to the storage system 102 and/or can provide storage system 102 storing services. In some implementations, more than service provider 108 can provide the storage system 102, e.g., a network of service providers 108 can provide storage system 102 services.

The storage system 102 can include memory locations for storage of entity A and entity B data. For example, data belonging to the entity A 104 can be stored in data A 114 memory location in the storage system 102 and data belonging to the entity B 106 can be stored in data B 116 memory location in the storage system 102. Entity A 104 can read and write to the data A memory location 114 (shown as "<read/write>" in FIG. 1). Similarly, entity B 106 can read and write to the data B memory location 116. Various other privileges, permissions, and/or rights can be granted/denied to entities wishing to access and/or share the data stored in the storage system 102.

In some implementations, the memory locations 114, 116 can include their respective shared data memory locations. For example, data A storage location 114 can include a shared data A 124 memory location and data B storage location 116 can include a shared data B 126 memory location. The shared data memory locations 124, 126 can contain data that may be designated by the entities A and B 104, 106, respectively, for sharing. Thus, the data stored in shared data memory locations 124, 126 can be shared between entities and/or other third parties.

The data stored in shared memory locations 124, 126 can be replicated into aggregated view(s) 112 memory location. The aggregated view(s) 112 memory can be accessed by the entity A 104, entity B 106, and third party 110 on the read (shown as "<read>") basis, whereas the service provider 108 can perform read and write functions on the aggregated view(s) 112.

In some implementations, entities A and B can also include data sharing policies that can define how the data belonging to them can be shared. Each entity can define how the data can be shared with other entities as well as third parties. The entity's sharing policy can also define which data can be shared and how it is to be presented for sharing with other entities and/or third parties. Further, the entities may be required to agree to the sharing policies in order to receive data. Thus, for example, in order to receive a shared data B from entity B, the entity A 104 (or the third party 110) can be required to agree to the provisions of the sharing policy setup by the entity B. The sharing policies can also define various restrictions, confidentiality provisions, requirements, etc. for when and how the data can be shared and which entities can be allowed to receive shared data. In some implementations, a set of standard sharing policies can be provided by the platform, which can enable unifying and/or combining sharing policies among several entities and allowing a simplified use of them.

In some exemplary embodiments, the sharing policies can also include at least one of the following types of information: type of data for sharing, e.g., specific key performance indicators ("KPIs"), where the types of data for sharing can be described in the specific data sharing catalogs; data anonymization and/or de-identification options, where, for example, the sharing policy can define whether the name of a company clearly appears in the shared data and/or should be removed (e.g., de-identified, anonymized, etc.), whether an exact data should be shown and/or only a data range should be indicated in the shared data (e.g., between $300 million to $500 million), etc.; update types, e.g., whether data views associated with the shared data should be updated immediately and/or only after a certain period of time (e.g., once per month); types of services that are eligible to use the shared data; and/or any other parameters of the shared data.

In some implementations, the shared data can be accessed by the entities and/or third parties using various integrated and/or aggregated views 112. The shared data can also be combined with other data (e.g., geospatial data, statistics, etc.). Further, the shared data can include current data, historical data, projected data, planning data, etc.

Figure 2:
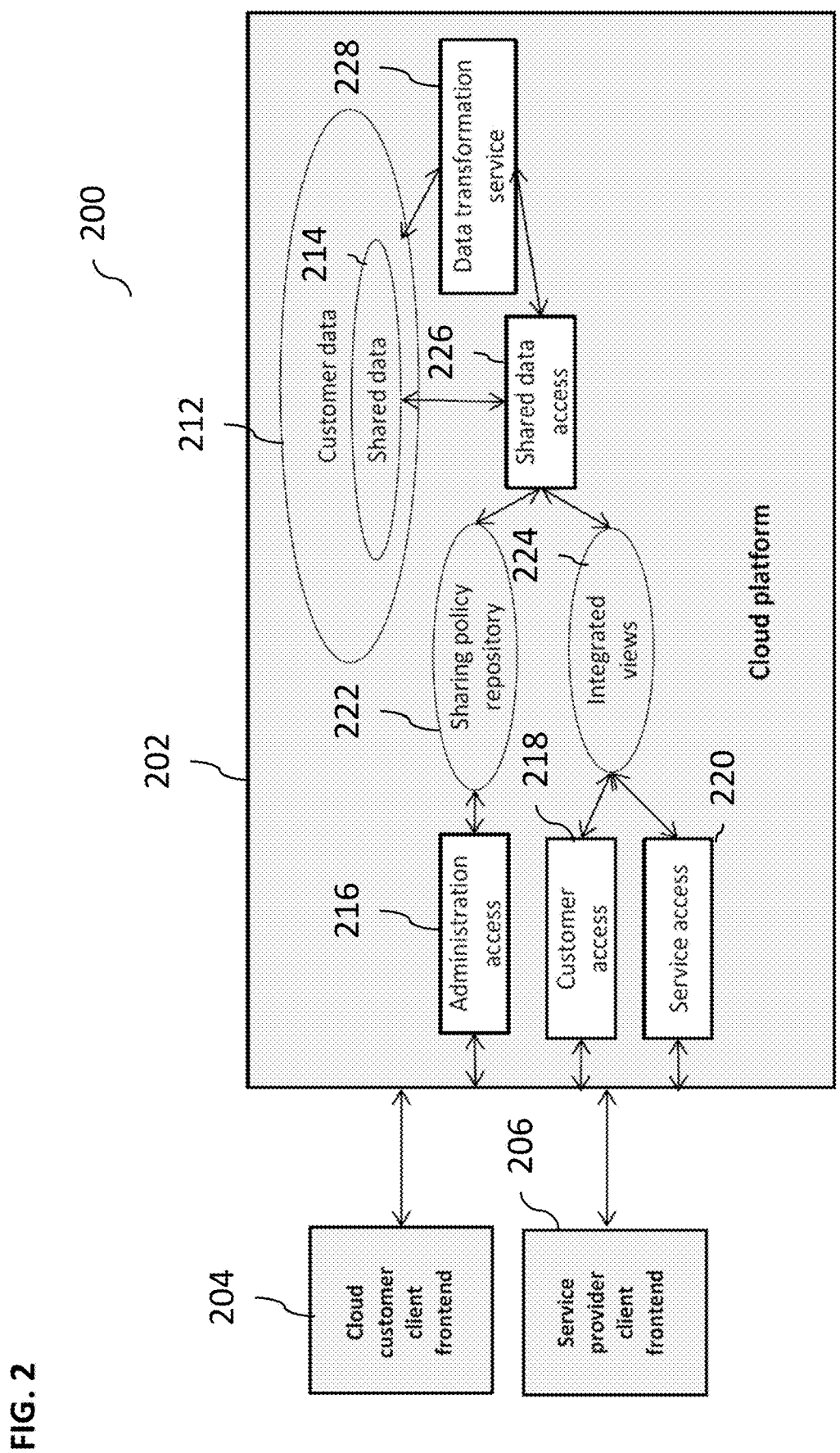
FIG. 2 illustrates an exemplary system for sharing data, according to some implementations of the current subject matter.

FIG. 2 illustrates an exemplary system 200 for sharing data, according to some implementations of the current subject matter. The system 200 can include a cloud platform system 202 communicatively coupled with a cloud customer client frontend component 204 and a service provider client frontend component 206. The component 204 can be part of an entity (e.g., entity A 104 or entity B 106, as shown in FIG. 1). The component 206 can be part of a service provider (e.g., service provider 108, as shown in FIG. 1). The cloud platform 202 can store customer data 212, which can include a shared data 214. The customer data 212 and/or shared data 214 can be stored in any type of memory location, database, etc. The platform 202 can also include a sharing policy repository 222, which can store sharing policies of various entities (e.g., entity A 104 or entity B 106, as shown in FIG. 1). Further, the platform 202 can also store integrated views 224, which can be used to provide and/or view data that has been shared by the entities.

The client frontend component 204 can be used by the entities 104, 106 to access their own data as well as shared data of other entities stored in the system 202. The service provider 108 can use the frontend component 206 for accessing the data in the system 202.

In order to provide sharing of data, the platform can also include an administration access component 216, a customer access component 218, a service access component 220, a shared data access component 226, and a data transformation service component 228. The components 216-228 can be software, hardware, and/or a combination of software and hardware. The administration access component 216 can be used by entities for the purposes of performing various administrative tasks, including receiving sharing policies, receiving updates to sharing policies, storing sharing policies in the sharing policy repository 222, etc. The component 216 can be accessed through the frontend components 204, 206 and can be used to define sharing policies by the entities desiring to share various data.

The customer access component 218 can be used by the entities for reading shared data as well as writing data (e.g., entity A 104 can use the customer access component 218 for writing data to its data A storage location 114, as shown in FIG. 1). The service access component 220 can be also be used by the entities for the purposes of reading and/or writing data. The component 220 can be used accessed by the service provider 108 through the service provider client frontend 206 to read and/or write various data. Both components 218 and 220 can be communicatively coupled to the integrated views component 224, which can provide materialized views and/or non-materialized views of the shared data that may be provided by the entities through their shared data storage locations (i.e., shared data storage locations 124, 126, as shown in FIG. 1).

The shared data access component 226 can be used for the purposes of providing access to the shared data. It is communicatively coupled to the shared data storage location 214 and the sharing policy repository 222 as well as integrated views component 224. In some implementations, the entities desiring access to the shared data of a company can generate a request to view/read/receive such shared data. The shared data access component 226 can receive such request. Upon receiving the request, the data access component 226 can check the sharing policy stored in the sharing policy repository 222 and if the sharing policy permits access to the shared data to the requesting entity, the data access component 226 can obtain the data from the shared data storage location 214 and supply such shared to data in a way defined by the sharing policy in one or more integrated views using the integrated views component 224. The requesting entity can view the shared data through its cloud customer client frontend component. In the event that the shared data access component 226 is unable to locate an appropriate sharing policy in the sharing policy repository, the request for access/reading/receiving data can be denied. Alternatively, the requesting entity can be directed to negotiate a sharing policy with the company, whose data it seeks to access. In some implementations, the sharing policies can be determined prior to receiving any access requests. Further, entities can select a type of a sharing policy when the entities agree to share their data, so that the groups of entities can use the same sharing policy.

In some implementations, the data transformation service component 228 can be accessed to transform and/or translate the shared data into a particular format that may be desired by the requesting entity and/or in accordance with format requirements defined by the sharing policy. In some implementations, the shared data can be in a uniform format (e.g., ERP type data), and might not need to be transformed/translated. In alternate implementations, the requesting entity can request that the shared data is provided to it in a specific format, which can be identified in the request. The data transformation service component 228 can be used to perform transformation/translation of the shared data into the requested format. Further, depending on the structure of entity's data, specific transformation services may be needed to transform the data from the entity-specific data structure into that described in the data catalogs.

In some implementations, the shared data access component 226 can obtain the shared data based on the sharing policies, as available from the sharing policy repository 222, and can combine the shared data from different customers into integrated views using integrated views component 224. Access to shared data can be provided by using the platform-dependent data access methods, for example, using views of an in-memory database. As stated above, the integrated views can be materialized (with replication of data in the view) and/or non-materialized (with direct compilation of data in the view during the view querying).

In some implementations, the current subject matter system can allow entities to exploit the data and/or infrastructure already provided in the cloud. The entities can select a specific sharing policy for sharing data and receive the requested shared data, whereby operations involved in providing the shared data can be automated and transparent to them. The entities can avoid additional efforts for configuring the data access and/or triggering the data exchange.

In some implementations, the current subject matter can be implemented in various in-memory database systems, such as a High Performance Analytic Appliance ("HANA") system as developed by SAP SE, Walldorf, Germany. Various systems, such as, enterprise resource planning ("ERP") system, supply chain management system ("SCM") system, supplier relationship management ("SRM") system, customer relationship management ("CRM") system, and/or others, can interact with the in-memory system for the purposes of accessing data, for example. Other systems and/or combinations of systems can be used for implementations of the current subject matter. The following is a discussion of an exemplary in-memory system.

Figure 3:
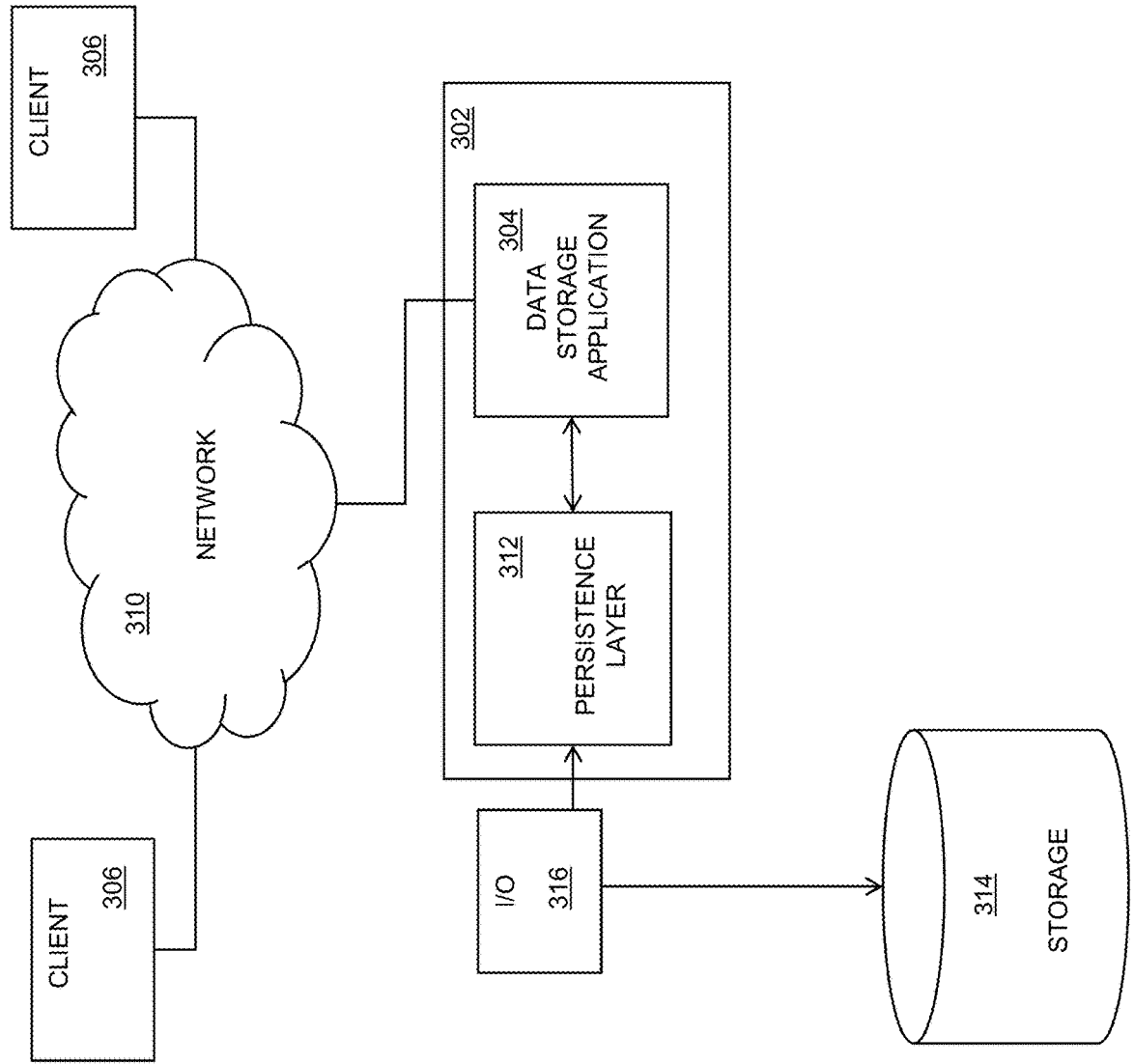
FIG. 3 is a diagram illustrating an exemplary system including a data storage application, according to some implementations of the current subject matter.

FIG. 3 illustrates an exemplary system 300 in which a computing system 302, which can include one or more programmable processors that can be collocated, linked over one or more networks, etc., executes one or more modules, software components, or the like of a data storage application 304, according to some implementations of the current subject matter. The data storage application 304 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 302 as well as to remote users accessing the computing system 302 from one or more client machines 306 over a network connection 310. One or more user interface screens produced by the one or more first modules can be displayed to a user, either via a local display or via a display associated with one of the client machines 306. Data units of the data storage application 304 can be transiently stored in a persistence layer 312 (e.g., a page buffer or other type of temporary persistency layer), which can write the data, in the form of storage pages, to one or more storages 314, for example via an input/output component 316. The one or more storages 314 can include one or more physical storage media or devices (e.g. hard disk drives, persistent flash memory, random access memory, optical media, magnetic media, and the like) configured for writing data for longer term storage. It should be noted that the storage 314 and the input/output component 316 can be included in the computing system 302 despite their being shown as external to the computing system 302 in FIG. 3.

Data retained at the longer term storage 314 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Figure 4:
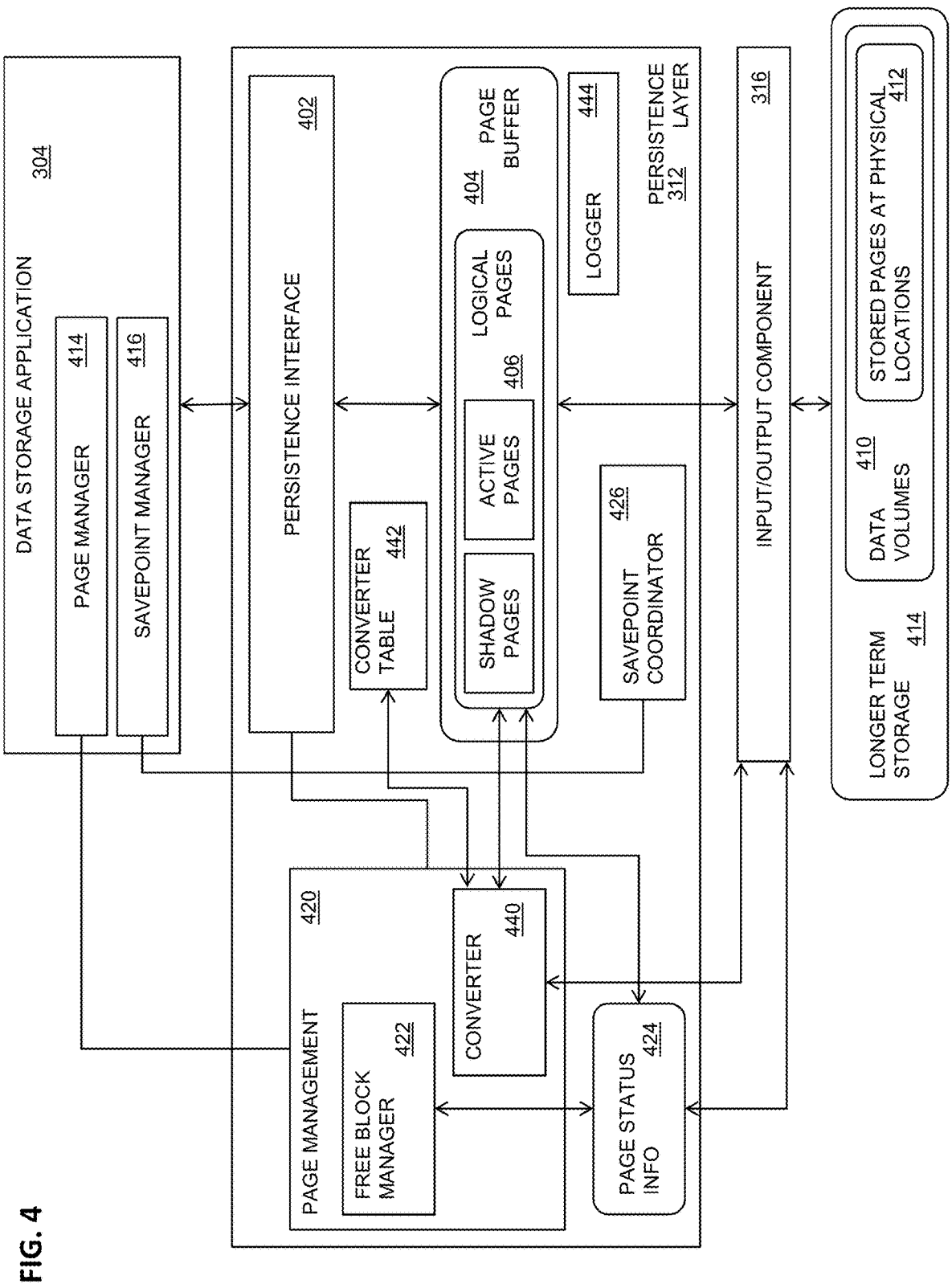
FIG. 4 is a diagram illustrating details of the system of FIG. 3.

FIG. 4 illustrates exemplary software architecture 400, according to some implementations of the current subject matter. A data storage application 304, which can be implemented in one or more of hardware and software, can include one or more of a database application, a network-attached storage system, or the like. According to at least some implementations of the current subject matter, such a data storage application 304 can include or otherwise interface with a persistence layer 312 or other type of memory buffer, for example via a persistence interface 402. A page buffer 404 within the persistence layer 312 can store one or more logical pages 406, and optionally can include shadow pages, active pages, and the like. The logical pages 406 retained in the persistence layer 312 can be written to a storage (e.g. a longer term storage, etc.) 314 via an input/output component 316, which can be a software module, a sub-system implemented in one or more of software and hardware, or the like. The storage 314 can include one or more data volumes 410 where stored pages 412 are allocated at physical memory blocks.

In some implementations, the data storage application 304 can include or be otherwise in communication with a page manager 414 and/or a savepoint manager 416. The page manager 414 can communicate with a page management module 420 at the persistence layer 312 that can include a free block manager 422 that monitors page status information 424, for example the status of physical pages within the storage 314 and logical pages in the persistence layer 312 (and optionally in the page buffer 404). The savepoint manager 416 can communicate with a savepoint coordinator 426 at the persistence layer 312 to handle savepoints, which are used to create a consistent persistent state of the database for restart after a possible crash.

In some implementations of a data storage application 304, the page management module of the persistence layer 312 can implement a shadow paging. The free block manager 422 within the page management module 420 can maintain the status of physical pages. The page buffer 404 can include a fixed page status buffer that operates as discussed herein. A converter component 440, which can be part of or in communication with the page management module 420, can be responsible for mapping between logical and physical pages written to the storage 314. The converter 440 can maintain the current mapping of logical pages to the corresponding physical pages in a converter table 442. The converter 440 can maintain a current mapping of logical pages 406 to the corresponding physical pages in one or more converter tables 442. When a logical page 406 is read from storage 314, the storage page to be loaded can be looked up from the one or more converter tables 442 using the converter 440. When a logical page is written to storage 314 the first time after a savepoint, a new free physical page is assigned to the logical page. The free block manager 422 marks the new physical page as "used" and the new mapping is stored in the one or more converter tables 442.

The persistence layer 312 can ensure that changes made in the data storage application 304 are durable and that the data storage application 304 can be restored to a most recent committed state after a restart. Writing data to the storage 314 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 444 can also be included to store the changes made to the data of the data storage application in a linear log. The logger component 444 can be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 444 whenever a change is made. This information can be written to disk at latest when the transaction ends. The log entries can be persisted in separate log volumes while normal data is written to data volumes. With a redo log, committed changes can be restored even if the corresponding data pages were not written to disk. For undoing uncommitted changes, the persistence layer 312 can use a combination of undo log entries (from one or more logs) and shadow paging.

The persistence interface 402 can handle read and write requests of stores (e.g., in-memory stores, etc.). The persistence interface 402 can also provide write methods for writing data both with logging and without logging. If the logged write operations are used, the persistence interface 402 invokes the logger 444. In addition, the logger 444 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 444. For an entry of type "update", for example, this would be the identification of the affected record and the after image of the modified data.

When the data application 304 is restarted, the log entries need to be processed. To speed up this process the redo log is not always processed from the beginning. Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 444 is invoked for writing log entries, it does not immediately write to disk. Instead it can put the log entries into a log queue in memory. The entries in the log queue can be written to disk at the latest when the corresponding transaction is finished (committed or aborted). To guarantee that the committed changes are not lost, the commit operation is not successfully finished before the corresponding log entries are flushed to disk. Writing log queue entries to disk can also be triggered by other events, for example when log queue pages are full or when a savepoint is performed.

With the current subject matter, the logger 444 can write a database log (or simply referred to herein as a "log") sequentially into a memory buffer in natural order (e.g., sequential order, etc.). If several physical hard disks/storage devices are used to store log data, several log partitions can be defined. Thereafter, the logger 444 (which as stated above acts to generate and organize log data) can load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers can be reordered from log segments of all partitions during recovery to the proper order.

As stated above, the data storage application 304 can use shadow paging so that the savepoint manager 416 can write a transactionally-consistent savepoint. With such an arrangement, a data backup comprises a copy of all data pages contained in a particular savepoint, which was done as the first step of the data backup process. The current subject matter can be also applied to other types of data page storage.

Figure 5:
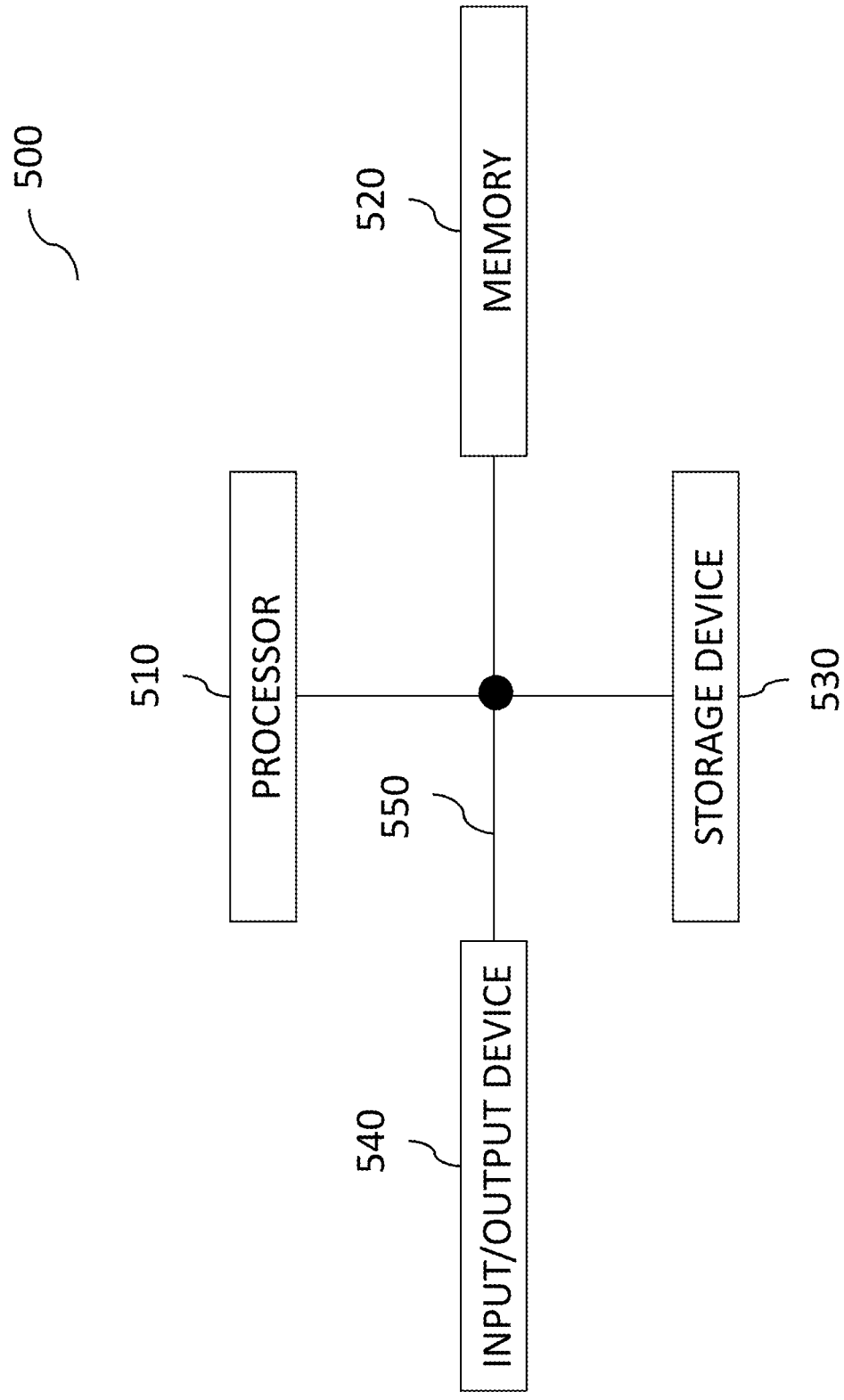
FIG. 5 illustrates an exemplary system, according to some implementations of the current subject matter.

In some implementations, the current subject matter can be configured to be implemented in a system 500, as shown in FIG. 5. The system 500 can include a processor 510, a memory 520, a storage device 530, and an input/output device 540. Each of the components 510, 520, 530 and 540 can be interconnected using a system bus 550. The processor 510 can be configured to process instructions for execution within the system 500. In some implementations, the processor 510 can be a single-threaded processor. In alternate implementations, the processor 510 can be a multi-threaded processor. The processor 510 can be further configured to process instructions stored in the memory 520 or on the storage device 530, including receiving or sending information through the input/output device 540. The memory 520 can store information within the system 500. In some implementations, the memory 520 can be a computer-readable medium. In alternate implementations, the memory 520 can be a volatile memory unit. In yet some implementations, the memory 520 can be a non-volatile memory unit. The storage device 530 can be capable of providing mass storage for the system 500. In some implementations, the storage device 530 can be a computer-readable medium. In alternate implementations, the storage device 530 can be a floppy disk device, a hard disk device, an optical disk device, a tape device, non-volatile solid state memory, or any other type of storage device. The input/output device 540 can be configured to provide input/output operations for the system 500. In some implementations, the input/output device 540 can include a keyboard and/or pointing device. In alternate implementations, the input/output device 540 can include a display unit for displaying graphical user interfaces.

Figure 6:
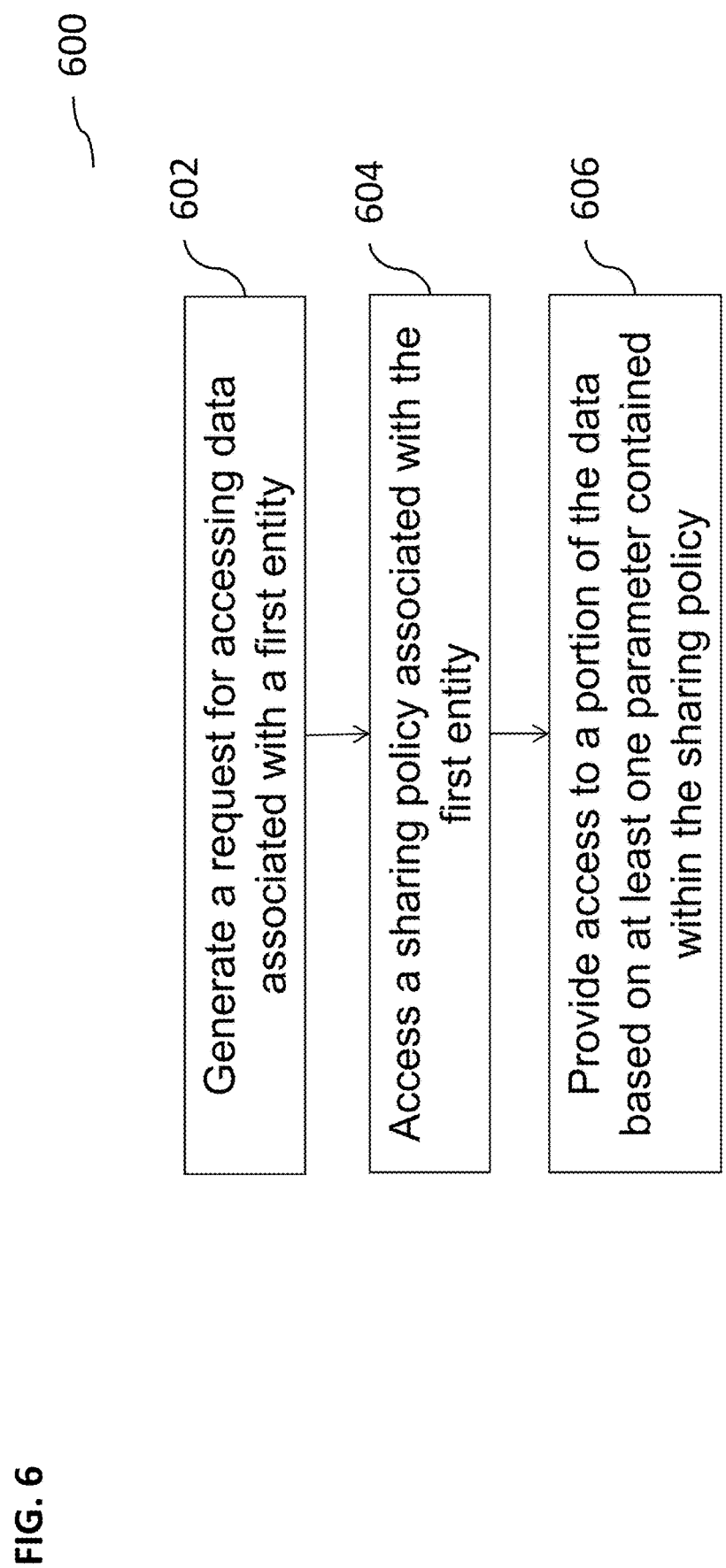
FIG. 6 illustrates an exemplary method, according to some implementations of the current subject matter.

FIG. 6 illustrates an exemplary method 600, according to some implementations of the current subject matter. At 602, a request for accessing data associated with a first entity (e.g., entity 104, as shown in FIG. 1) can be generated by, for example, a second entity (e.g., entity 106 and/or third party 110, as shown in FIG. 1). At 604, a sharing policy associated with the first entity can be accessed. This can be accomplished by the shared data access component 226, as shown in FIG. 2, accessing the sharing policy repository 222. At 606, access to a portion of the data (e.g., shared data 214, as shown in FIG. 2) can be provided based on at least one parameter contained within the sharing policy. The parameters can be specific to the sharing policy and can include at least one of the following: type of data to be shared, whether the shared data is to be anonymized, format of data to be shared, etc. Access to the portion of the data can be provided using at least one integrated view using the integrated views component 224.

In some implementations, the current subject matter can include one or more of the following optional features. The method 600 can also include transforming the portion of data into a predetermined data format. The predetermined data format can be defined in the generated request for accessing data. This can be accomplished using the data transformation service 228, as shown in FIG. 2.

In some implementations, the method 600 can also include combining, based on the generated request, a plurality of portions of data associated with a plurality of entities in accordance with a sharing policy associated with each entity in the plurality of entities, and providing access to the combined plurality of portions of data. As stated above, the shared data access component 226 can determine a plurality of sharing policies from the sharing policy repository 222 and based on those policies, present a combined shared data to the requestor.

In some implementations, the data access can be provided in at least one of the following: a materialized view containing a replication of the portion of data and a non-materialized view containing a direct compilation of data in the integrated view.

In some implementations, data associated with the first entity can be stored in a cloud storage (e.g., cloud platform 202, as shown in FIG. 2).

The portion of data can include at least one of the following: a current data associated with the first entity, a historical data associated with the first entity, a prospective data associated with the first entity, a planning data associated with the first entity, etc.

In some implementations, the method 600 can also include denying, based on the sharing policy, access to the portion of data.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
    receiving, from a first entity and at a cloud storage system, a request for accessing data associated with a second entity, the request indicating a requested data format for receiving the data at the first entity, the cloud storage system storing data for the second entity, the stored data including designated portions of the stored data for sharing with other entities including the first entity, the designated portions of the stored data for sharing in accordance with a sharing policy, the sharing policy indicating a first parameter indicative of types of data to be shared, a second parameter indicative of data anonymization of a first field to be anonymized before sharing, and a third parameter indicating a second field is to be shared as a range rather than as an exact value;
    accessing, by the cloud storage system, the sharing policy associated with the second entity;
    providing, to the first entity and by the cloud storage system, read access to a portion of the data associated with the second entity, the read access provided based on at least the first parameter, the second parameter, and the third parameter contained within the sharing policy, wherein the read access to the portion of the data is provided using at least one integrated view, the integrated view providing read only access to the first entity via a first interface to the portion of the data;
    providing, to a service provider and via a second interface, read-write access to the at least one integrated view;
    transforming, in response to receiving the request, the portion of the data into the requested data format, wherein transforming the portion of the data into the requested data format comprises anonymizing, based on the second parameter and the third parameter of the sharing policy, the portion of the data; and
    combining the portion of the data with geospatial data,
    wherein at least one of the generating, the accessing, the providing, and the transforming is performed by at least one processor of at least one computing system, wherein the service provider provides services to the at least one computing system.

2. The method according to claim 1, wherein transforming the portion of the data into the requested data format comprises:
    retrieving, by a data transformation component, the portion of the data associated with the second entity, the portion of the data stored in a database of the cloud storage system and configured in a first data format;
    transforming, by the data transformation component, the portion of the data from the first data format into the requested data format; and
    transmitting, by the data transformation component to a shared data access component, the portion of the data in the requested data format.

3. The method according to claim 1, further comprising combining, based on the received request, a plurality of portions of data associated with a plurality of entities in accordance with the sharing policy associated with each entity in the plurality of entities; and
providing access to the combined plurality of portions of data.

4. The method according to claim 1, wherein the data access is provided in at least one of the following: a materialized view containing a replication of the portion of the data and a non-materialized view containing a direct compilation of data in the integrated view.

5. The method according to claim 1, wherein the data associated with the second entity is stored in the cloud storage system.

6. The method according to claim 1, wherein the portion of the data includes at least one of the following: a current data associated with the second entity, a historical data associated with the second entity, a prospective data associated with the second entity, and a planning data associated with the second entity.

7. The method according to claim 1, further comprising denying, based on the sharing policy, access to the portion of the data.

8. A system comprising:
at least one programmable processor; and
a machine-readable medium storing instructions that, when executed by the at least one programmable processor, cause the at least one programmable processor to perform operations comprising:
receiving, from a first entity and at a cloud storage system, a request for accessing data associated with a second entity, the request indicating a requested data format for receiving the data at the first entity, the cloud storage system storing data for the second entity, the stored data including designated portions of the stored data for sharing with other entities including the first entity, the designated portions of the stored data for sharing in accordance with a sharing policy, the sharing policy indicating a first parameter indicative of types of data to be shared, a second parameter indicative of data anonymization of a first field to be anonymized before sharing, and a third parameter indicating a second field is to be shared as a range rather than as an exact value;
accessing, by the cloud storage system, the sharing policy associated with the second entity;
providing, to the first entity and by the cloud storage system, read access to a portion of the data associated with the second entity, the read access provided based on at least the first parameter, the second parameter, and the third parameter contained within the sharing policy, wherein the read access to the portion of the data is provided using at least one integrated view, the integrated view providing read only access to the first entity via a first interface to the portion of the data;
providing, to a service provider and via a second interface, read-write access to the at least one integrated view;
transforming, in response to receiving the request, the portion of the data into the requested data format, wherein transforming the portion of the data into the requested data format comprises anonymizing, based on the second parameter and the third parameter of the sharing policy, the portion of the data; and
combining the portion of the data with geospatial data.

9. The system according to claim 8, wherein the operations further comprise:
retrieving the portion of the data associated with the second entity, the portion of the data stored in a database of the cloud storage system and configured in a first data format;
transforming the portion of the data front the first data format into the requested data format; and
transmitting the portion of the data in the requested data format.

10. The system according to claim 8, wherein the operations further comprise
combining, based on the received request, a plurality of portions of data associated with a plurality of entities in accordance with the sharing policy associated with each entity in the plurality of entities; and
providing access to the combined plurality of portions of data.

11. The system according to claim 8, wherein the data access is provided in at least one of the following: a materialized view containing a replication of the portion of the data and a non-materialized view containing a direct compilation of data in the integrated view.

12. The system according to claim 8, wherein the data associated with the second entity is stored in the cloud storage system.

13. The system according to claim 8, wherein the portion of the data includes at least one of the following: a current data associated with the second entity, a historical data associated with the second entity, a prospective data associated with the second entity, and a planning data associated with the second entity.

14. The system according to claim 8, wherein the operations further comprise denying, based on the sharing policy, access to the portion of the data.

15. A computer program product comprising a non-transitory machine-readable medium storing instructions that, when executed by at least one programmable processor, cause the at least one programmable processor to perform operations comprising:
receiving, from a first entity and at a cloud storage system, a request for accessing data associated with a second entity, the request indicating a requested data format for receiving the data at the first entity, the cloud storage system storing data for the second entity, the stored data including designated portions of the stored data for sharing with other entities including the first entity, the designated portions of the stored data for sharing in accordance with a sharing policy, the sharing policy indicating a first parameter indicative of types of data to be shared, a second parameter indicative of data anonymization of a first field to be anonymized before sharing, and a third parameter indicating a second field is to be shared as a range rather than as an exact value;
accessing, by the cloud storage system, the sharing policy associated with the second entity;
providing, to the first entity and by the cloud storage system, read access to a portion of the data associated with the second entity, the read access provided based on at least the first parameter, the second parameter, and the third parameter contained within the sharing policy, wherein the read access to the portion of the data is provided using at least one integrated view, the integrated view providing read only access to the first entity via a first interface to the portion of the data;

providing, to a service provider and via a second interface, read-write access to the at least one integrated view;

transforming, in response to receiving the request, the portion of the data into the requested data format, wherein transforming the portion of the data into the requested data format comprises anonymizing, based on the second parameter and the third parameter of the sharing policy, the portion of the data; and combining the portion of the data with geospatial data.

16. The computer program product according to claim 15, wherein the operations further comprise:

retrieving the portion of the data associated with the second entity, the portion of the data stored in a database of the cloud storage system and configured in a first data format;

transforming the portion of the data from the first data format into the requested data format; and transmitting the portion of the data in the requested data format.

17. The computer program product according to claim 15, wherein the operations further comprise combining, based on the received request, a plurality of portions of data associated with a plurality of entities in accordance with the sharing policy associated with each entity in the plurality of entities; and providing access to the combined plurality of portions of data.

18. The computer program product according to claim 15, wherein the data access is provided in at least one of the following: a materialized view containing a replication of the portion of the data and a non materialized view containing a direct compilation of data in the integrated view.

19. The computer program product according to claim 15, wherein the data associated with the second entity is stored in the cloud storage system;

wherein the portion of the data includes at least one of the following: a current data associated with the second entity, a historical data associated with the second entity, a prospective data associated with the second entity, and a planning data associated with the second entity.

20. The computer program product according to claim 15, wherein the operations further comprise denying, based on the sharing policy, access to the portion of the data.

21. The method according to claim 1, wherein anonymizing the portion of the data comprises removing identification information of a person, a product, and/or a company from the portion of the data.

22. The method of claim 1, wherein the sharing policy indicates a fourth parameter indicating a frequency for an update of the stored data being shared, and wherein the read access is provided further based on the fourth parameter contained within the sharing policy.

* * * * *